United States Patent Office 3,506,678
Patented Apr. 14, 1970

3,506,678
CERTAIN 2-SUBSTITUTED-THIENO[2,3-d] IMIDAZOLES
Dale R. Hoff, Cranford, and Louis H. Peterson, Woodbridge, N.J., assignors to Merck & Co., Inc., Rahway, N.J., a corporation of New Jersey
No Drawing. Filed Feb. 21, 1967, Ser. No. 617,507
Int. Cl. C07d 91/00, 99/02
U.S. Cl. 260—302     3 Claims

ABSTRACT OF THE DISCLOSURE

Thienoimidazoles substituted at the 2-position with an aryl, naphthyl or 5- (or 6) membered aromatic heterocyclic radical with optional substitution at the 1- and 5-positions, which compounds are anthelmintic agents. Processes for preparing such compounds from 2-aminothiophenes via formation of an aminothienylcarboxamide with subsequent ring closure to the thienoimidazole. Anthelmintic compositions containing a substituted thienoimidazole as an essential active ingredient.

BACKGROUND OF THE INVENTION

This invention relates generally to novel 2-substituted thienoimidazoles, to chemical syntheses of such compounds, and to anthelmintic compositions containing a 2-substituted thienoimidazole as the active ingredient.

One feature of the invention is the provision of a novel ring system wherein two 5-membered heterocyclic rings have been joined together such that two of their carbon atoms form a common bond between them. Several fused 5-membered ring systems have been described in the art, such as the thieno-pyrroles where a thiophene ring and a pyrrole ring have been fused together, an imidazothiadiazole ring where a pyrrole ring and a thiadiazole ring have been linked such that one of the nitrogen atoms serves as a common bond between them, and a pyrazolothiadiazole ring system where a pyrazole moiety has been fused to a thiadiazole moiety. Nowhere in the prior art is there described a ring system where a thiophene ring and an imidazole ring have been fused such as are the compounds which are the subject of this invention. There is no indication in the prior art that such a system, if formed, would have anthelmintic properties. The novel thienoimidazoles herein described, in addition to possessing a new ring system, also possess significant anthelmintic activity.

SUMMARY

One object of the present invention is to provide novel thienoimidazoles substituted at the 2-position and chemical processes for making them. Another object is the provision of a method for combatting helminthiasis by treatment of an infected host with the thienoimidazoles herein described. A further object of the invention is to provide anthelmintic compositions in which a 2-substituted thienoimidazole is the effective ingredient in admixture with an appropriate carrier vehicle.

The novel thienoimidazoles provided by this invention may be represented by Formula I below

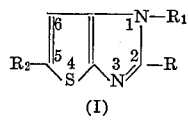

(I)

where R represents phenyl, halophenyl, naphthyl, halonaphthyl, or an aromatic heterocyclic radical selecected from the group consisting of furyl, pyridyl, pyrazinyl, and thiazolyl, wherein the point of attachment is at a carbon atom of said radical and the remaining carbon atoms of said ring are substituted with a member of the class consisting of hydrogen and loweralkyl groups; $R_1$ is hydrogen, loweralkyl, benzyl, loweralkanoyl, aroyl or hydroxyalkyl; and $R_2$ is hydrogen, halogen, phenyl, naphthyl, or loweralkyl. Also included within the compounds of this invention are acid addition salts of such compounds wherein the acid is a mineral acid such as hydrochloric or hydrobromic acid or an organic carboxylic acid. The salts are conveniently prepared by intimately contacting the thienoimidazole with a molar excess of the acid. In addition to the halogen acid salts, other typical salts which may be effectively employed as anthelmintic agents are mineral acid salts such as sulfate, nitrate, phosphate and the like, as well as salts of aliphatic acids such as the acetate, proprionate, trimethylacetate, or t-butylacetate, and salts of polycarboxylic acids, such as pamoate the succinate, oxalate, tartrate and the like. The particular acid salt is not a critical feature of the invention, but a non-toxic acid is preferred in those cases where the thienoimidazole is to be administered to a living host.

Also included within the scope of the invention are the processes employed for chemically synthesizing these novel thienoimidazoles. A five-step synthesis is involved, which comprises treating an appropriately substituted or unsubstituted 2-aminothiophene with a carboxylic acid halide to form a thienylcarboxamide, nitration of the thienylcarboxamide with nitric acid, followed by reduction of the nitro group with subsequent ring closure of the resulting 3-aminocarboxamide via treatment with phosphorus oxychloride. A more detailed disclosure of the steps involved in the synthesis is set forth below.

The invention also includes anthelmintic compositions where a 2-substituted thienoimidazole is distributed or dispersed in an appropriate carrier vehicle. In compositions used in the treatment of helminthiasis, the preferred carrier vehicle is a liquid drench, a bolus or capsule, or an animal feedstuff.

The following is a schematic diagram of the synthesis of the novel thienoimidazoles:

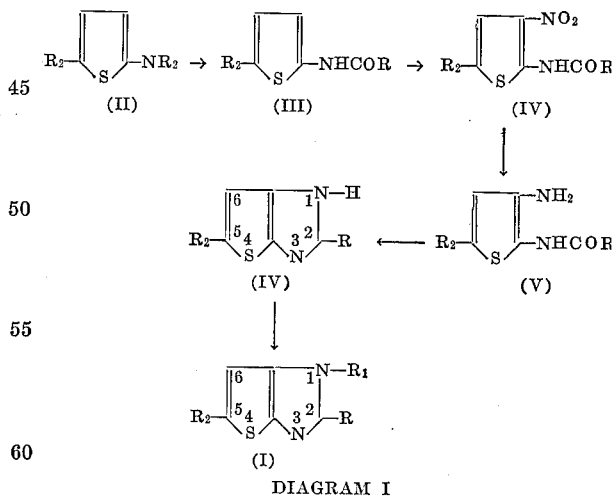

DIAGRAM I

DESCRIPTION OF THE PREFERRED EMBODIMENTS

The thienoimidazoles of Formula I are novel compounds which may be prepared by the following processes which are depicted schematically in Diagram I.

The first step in the synthesis involves the reaction of a carboxylic acid halide with a 2-aminothiophene of Formula II to form a thienylcarboxamide of Formula III. R and $R_2$ in Formulae II and III are as previously defined. The starting 2-amino and substituted 2-aminothiophenes are generally known in the art; those which are unknown can be prepared by methods known in this particular art. In step I, approximately 2 moles of acid halide are used for each mole of amine. The amine may be reacted as the free amine, or, in cases where the aminothiophene is unstable, it may be employed as a salt. The preferred salts are either stannous chloride salts or salts of the halogen acids, such as hydrochloric or hydrobromic acid. The reaction is carried out in a suitable solvent medium in the presence of sodium hydroxide. The preferred solvent is 1,2-dimethoxyethane, but solvents such as acetone, dioxane or tetrahydrofuran may also be used. For best results, the reaction is cooled in an ice bath until the addition of the acid chloride is complete. The rate of addition is such that the temperature is not allowed to rise above 20° C. The alkali and acid halide are added such that only a slight excess of alkali is present so that the acid halide is not used up due to hydrolysis. After the reaction is complete, the thienylcarboxamide may then be recovered by techniques known to those skilled in this particular art. Representative examples of thienylcarboxamides which can be obtained in this fashion are:

N-(2-thienyl)-thiazole-4-carboxamide,
N-(2-thienyl)-pyridine-3-carboxamide,
N-(2-thienyl)-benzenecarboxamide,
N-(2-thienyl)-thiazole-2-carboxamide,
N-(2-thienyl)-furan-2-carboxamide,
N-(5-phenyl-2-thienyl)-thiazole-4-carboxamide,
N-(5-phenyl-2-thienyl)-benzenecarboxamide,
N-(5-methyl-2-thienyl)-thiazole-4-carboxamide,
N-(5-phenyl-2-thienyl)-thiazole-2-carboxamide,
N-(5-chloro-2-thienyl)-thiazole-2-carboxamide, and
N-(5-chloro-2-thienyl)-benzenecarboxamide.

The second step in the synthesis of the thienoimidazoles involves the selective nitration of a thienylcarboxamide to form a 3-nitrothienylcarboxamide of Formula IV, where R and $R_2$ are as previously defined. Concentrated nitric acid, dissolved in acetic anhydride, is added to a solution of the thionylcarboxadie in acetic anhydride. Preferably, the reaction mixture and the acid are both chilled before the addition, and the reaction temperature is kept between —2° C. and 5° C. The use of nitric acid in conjunction with acetic anhydride gives selective nitration in the carbon position ortho to the amide. The 3-nitrothienylcarboxamide may be isolated by techniques known in the art. Representative examples of 3-nitrothienylcarboxamides which may be obtained in this fashion are:

N-(3-nitro-2-thienyl)-thiazole-4-carboxamide,
N-(3-nitro-2-thienyl)-pyridine-3-carboxamide,
N-(3-nitro-2-thienyl)-benzenecarboxamide,
N-(3-nitro-2-thienyl)-thiazole-2-carboxamide,
N-(3-nitro-2-thienyl)-furan-2-carboxamide,
N-(3-nitro-5-phenyl-2-thienyl)-thiazole-4-carboxamide,
N-(3-nitro-5-phenyl-2-thienyl)benzenecarboxamide,
N-(3-nitro-5-phenyl-2-thienyl)-thiazole-2-carboxamide,
N-(5-methyl-3-nitro-2-thienyl)-thiazole-4-carboxamide,
N-(5-chloro-3-nitro-2-thienyl)-thiazole-2-carboxamide, and
N-(5-chloro-3-nitro-2-thienyl)-benzenecarboxamide.

The third step in the synthesis involves the catalytic reduction of a 3-nitro-2-thienylcarboxamide to a 3-amino-2-thienylcarboxamide of Formula V where R and $R_2$ are as previously defined. The reaction is carried out in a suitable solvent medium in the presence of a palladium-charcoal catalyst and trace amounts of a halogen acid, such as hydrochloric or hydrobromic acid. Preferred solvents for the reduction are absolute ethanol, methanol, or dioxane. The function of the halogen acid is to accelerate the rate of reduction and to stabilize the free aminothiophene formed. The 3-amino-2-thienylcarboxamide is separated from the reaction mixture and purified by techniques known to those skilled in the art. Representative examples of 3-amino-2-thienylcarboxamides which can be obtained in this fashion are:

N-(3-amino-2-thienyl)-thiazole-4-carboxamide,
N-(3-amino-2-thienyl)-pyrimidine-3-carboxamide,
N-(3-amino-2-thienyl)-benzenecarboxamide,
N-(3-amino-2-thienyl)-thiazole-2-carboxamide,
N-(3-amino-2-thienyl)-furan-2-carboxamide,
N-(3-amino-5-phenyl-2-thienyl)-thiazole-4-carboxamide,
N-(3-amino-5-phenyl-2-thienyl)benzenecarboxamide,
N-(3-amino-5-phenyl-2-thienyl)-thiazole-2-carboxamide,
N-(3-amino-5-methyl-2-thienyl)thiazole-4-carboxamide,
N-(3-amino-5-chloro-2-thienyl)-thiazole-2-carboxamide and
N-(5-chloro-3-amino-2-thienyl)-benzenecarboxamide.

Where alkyl substitution on the nitrogen at the 1-position of the thienoimidazole is desired, an alternate step is possible at this point. Alkyl substitution on the nitrogen is achieved by reacting the 3-amino-(2-thienyl)-carboxamide with an appropriate loweralkyl sulfate or loweralkyl halide, such as dimethyl sulfate or ethyl bromide in a suitable solvent such as chloroform or dimethylformamide in the presence of alkali. The secondary and tertiary amines thus formed are separated by careful chromatography over alumina, fractional recrystallization, or by other means known to those skilled in the art.

Representative compounds which may be formed in this way are:

N-(3-methylamino-2-thienyl)-thiazole-4-carboxamide,
N-(3-ethylamino-2-thienyl)-thiazole-4-carboxamide,
N-(3-methylamino-2-thienyl)-pyridine-3-carboxamide,
N-(3-ethylamino-2-thienyl)-thiazole-2-carboxamide,
N-(3-methylamino-5-phenyl-2-thienyl)-thiazole-4-carboxamide,
N-(3-ethylamino-2-thienyl)-thiazole-2-carboxamide,
N-(3-benzylamino-2-thienyl)-thiazole-4-carboxamide,
N-(3-benzylamino-5-phenyl-2-thienyl)-thiazole-4-carboxamide,
N-(3-benzylamino-5-phenyl-2-thienyl)-pyridine-3-carboxamide,
N-(3-β-hydroxyethylamino-2-thienyl)-thiazole-4-carboxamide, and
N-(5-chloro-3-N-ethylamino-2-thienyl)-pyridine-3-carboxamide.

The last step in the synthesis involves the ring closure of a 3-amino-2-thienylcarboxamide to a novel 2-substituted thienoimidazole of Formula I, where R, $R_1$ and $R_2$ are as previously defined. The ring closure is achieved by refluxing the 3-amino- or 3-substituted amino-(2-thienyl)-carboxamide with phosphorus oxychloride for about 10–20 hours. When the amino carboxamide is substituted at the 5-position, it is sometimes necessary to add a catalytic amount of dimethylformamide to the reaction mixture to bring about the ring closure. The crude thienoimidazole is purified by techniques known in the art. Representative examples of 2-substituted thienoimidazoles which can be obtained in this fashion are:

2-(3'-thienyl)-thieno-[2,3-d]-imidazole,
2-(4'-pyridyl)-thieno-[2,3-d]-imidazole,
2-p-fluorophenyl-thieno-[2,3-d]-imidazole,
5-phenyl-2-(3'-thienyl)-thieno-[2,3-d]-imidazole,
5-phenyl-2-phenyl-thieno-[2,3-d]-imidazole,
5-phenyl-2-(4'-pyridyl)-thieno-[2,3-d]imidazole,
5-chloro-2-(4'-thiazolyl)-thieno-[2,3-d]-imidazole,
5-methyl-2-(4'-thiazolyl)-thieno-[2,3-d]-imidazole,
5-ethyl-2-(2'-thiazolyl)-thieno-[2,3-d]-imidazole, and
5-p-fluorophenyl-2-(4'-thiazolyl)-thieno-[2,3-d]-imidazole.

Substitution on the 1-position nitrogen of the thienoimidazole can also be achieved by treating said thienoimidazole with sodium hydride in a suitable solvent medium hydride may be used if desired. The reaction takes sodium salt with a loweralkyl iodide, preferably one having less than five carbon atoms such as methyl, ethyl, or propyl iodide. Satisfactory results are obtained when a slight molar excess of sodium hydride is employed, although equimolar quantities of thienoimidazole and sodium hydride may be used of desired. The reaction takes place at room temperature but may be accelerated by warming the mixture on a steam bath. The solvent is diluted with water and the product is extracted with chloroform. The 1-alkyl-2-substituted thienoimidazole can be separated from the resulting mixture by techniques known to those skilled in the art.

The thienoimidazole may be acylated in a fashion similar to that described above by reacting the sodium salt of the thienoimidazole with an acyl halide, and preferably one having less than nine carbon atoms, such as acetyl chloride, acetyl bromide, propionyl chloride, butyryl chloride, valeroyl bromide, benzoyl chloride, phenyl acetyl chloride, and the like. The acyl halide is added directly to a solution or suspension of the thienoimidazole salt in an inert solvent such as benzene, toluene, xylene, dimethylformamide, and the like, and the acylation reaction is allowed to proceed at room temperature or temperatures up to about 100° C. Reaction temperatures in the range of 50°–75° C. are preferred. The 1-acyl-2-substituted thienoimidazoles thus formed are recovered from the reaction mixture by removal of the organic solvent and subsequent crystallization of the residual solid from solvents such as benzene or toluene or by other techniques known to those skilled in the art.

Representative 1-alkyl or 1-acyl compounds which can be prepared in this manner are:

1-methyl-2-(3'-thienyl)-thieno-[2,3-d]-imidazole,
1-ethyl-2-(3'-thienyl)-thieno-[2,3-d]-imidazole,
1-methyl-2-(4'-pyridyl)-thieno-[2,3-d]-imidazole,
1-ethyl-2-p-fluorophenyl-thieno-[2,3-d]-imidazole,
1-acetyl-2-(3'-thienyl)-thieno-[2,3-d]-imidazole,
1-ethyl-5-phenyl-2-(3'-pyridyl)-thieno-[2,3-d]-imidazole,
5-chloro-1-methyl-2-(4'-thiazolyl)-thieno-[2,3d]-imidazole,
1-benzoyl-5-chloro-2-(4'-thiazolyl)-thieno-[2,3-d]-imidazole,
1-acetyl-2-(2'-thiazolyl)-thieno-[2,3-d]-imidazole,
5-chloro-1-propionyl-2-(4'-thiazolyl)-thieno-[2,3-d]-imidazole,
1-ethyl-5-p-fluorophenyl-2-(4'-thiazolyl)-thieno-[2,3-d]-imidazole, and
1-ethyl-5-methyl-2-(4'-thiazolyl)-thieno-[2,3-d]-imidazole.

According to the present invention, it has been found that the novel 2-substituted thienoimidazoles possess a significant degree of anthelmintic activity and may be effectively employed in the treatment and/or prevention of helminthiasis. As anthelmintics the compounds are effective against a broad spectrum of helminths including Haemonchus, Trichostrongylus, Ostertagia, Nematodirus, Cooperia, Bunostomum, Oesophagostomum, Chabertia, *Enterobius vermicularis,* and Ascaris. It will be appreciated by those skilled in the art that the optimal dose level will vary somewhat among the different types of helminths. When these compounds are employed as anthelmintics in domesticated animals, good results are obtained with daily oral doses of from about 20 to about 400 mg./kg. and with the preferred compounds, daily dose levels of from about 30 to about 100 mg./kg. are very satisfactory. The anthelmintic is generally administered orally, but this is not essential. Intramuscular, intratracheal, or intraruminal injection may be utilized if desired.

When the 2-substituted thienomidazoles are to be administered in dry, solid unit dosage form, capsules, boluses or tablets containing the desired amount of anthelmintic distributed in a pharmaceutically acceptable vehicle are usually employed. These are prepared by intimately and uniformly mixing the active ingredients with suitable finely divided diluents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired and the severity and type of parasitic infestation. For large animals such as sheep, swine, or cattle, boluses weighing up to 15 grams may be used although it is preferred to employ boluses weighing from 5–10 grams and containing from 2–8 grams of the 2-substituted thienoimidazole. These boluses as well as smaller size tablets contain binders and lubricant and are compounded by techniques known in this art. Capsules are readily prepared by mixing the active ingredients with a diluent such as starch or lactose and filling into the capsule.

In order to treat infected animals by means of a drench, the 2-substituted thienoimidazoles are mixed with a suspending agent such as bentonite, clays, water-soluble starches, cellulose derivatives, gums, surface active agents and the like, and the solid product added to water just prior to administration. In the pre-drench formulation, in addition to the suspending agent, such ingredients as preservatives, antifoam compounds and the like may be employed. Alternatively, ready to use drench formulations are sometimes utilized. The preferred drenches in accordance with this invention contain from about 5–50% by weight of a 2-substituted thienoimidazole compound.

The 2-substituted thienoimidazoles may also be administered as a component of the animal feed or dissolved or suspended in drinking water. The compounds described above may be intimately dispersed in or mixed with an inert carrier and diluent. The term inert carrier is intended to mean one that is non-reactive with respect to the 2-substituted thienoimidazole and which, in addition, may be safely administered to the animals. The carrier diluent is preferably one that is or may be an ingredient of the animal ration.

The following examples are given for the purpose of illustration and not by way of limitation:

Example 1.—N-(2-thienyl)-thiazole-4-carboxamide

A suspension of 17.5 g. of the tin chloride salt of 2-aminothiophene in 150 ml. of 1,2-dimethoxy ethane is stirred while a solution of 26 g. of thiazole-4-carboxylic acid chloride is added in portions along with 50 ml. of 11.7 N sodium hydroxide. The rate of addition is adjusted according to the pH of the mixture so as not to hydrolyze the acid chloride. The reaction mixture is cooled in an ice bath during addition. After the addition is complete, the mixture is stirred for about 15 minutes and diluted with about 100 ml. of water. The mixture is then extracted with 3×100 ml. of chloroform, the chloroform extracts are combined, dried over magnesium sulfate and concentrated to a residue. The residue is dissolved in chloroform; the solution is diluted with an equal volume of benzene and chromatographed over a column of 165 g. of aluminum oxide. The column is eluted with mixtures of benzene and chloroform, which are gradually enriched with chloroform. From the 60% $CHCl_3$ eluate there is obtained 7.77 g. (62%) of N-(2-thienyl)-thiazole-4-carboxamide, M.P. 145–146° C.

In Example 1, when the above procedure is repeated using benzoyl chloride as the acid chloride, N-(2-thienyl)-benzenecarboxamide is obtained.

When pyridine-3-carbonyl chloride is used as the acid chloride, N-(2-thienyl)-pyridine-3-carboxamide is obtained.

When thiophene-3-carbonyl chloride is used as the acid chloride, N-(2-thienyl)-thiophene-3-carboxamide is obtained.

Example 2.—N-(3-nitro-2-thienyl)-thiazole-4-carboxamide

A solution of 13.9 g. of N-(2-thienyl)-thiazole-4-carboxamide in 450 ml. of acetic anhydride is cooled to about −2° C. with stirring, and a cold mixture of 19 ml. of concentrated nitric acid and 90 ml. of acetic anhydride is added over 15 minutes. The temperature rises to about 2° C. The mixture is stirred for 10 minutes, diluted with 450 ml. of ice water, and then poured into 2 l. of water. It is stirred until there is no more acetic anhydride visible. The resulting precipitate is filtered off and the filtrate is extracted with 2×500 ml. of chloroform. The precipitate is then boiled in 150 ml. of chloroform and re-filtered. The filtrate is added to the chloroform extract and the combined solution dried over magnesium sulfate and concentrated to a residue. The residue is triturated with petroleum ether and filtered. The solid product thus obtained is dissolved in methylene chloride and chromatographed over a column of 300 g. of aluminum oxide. On elution with methylene chloride, 6.17 g. of N-(3-nitro-2-thienyl)-thiazole-4-carboxamide are obtained, M.P. 218–219° C.

In Example 2, when N-(2-thienyl)-benzenecarboxamide is used as the carboxamide, N-(3-nitro-2-thienyl)-benzenecarboxamide is obtained.

When N-(2-thienyl)-pyridine-3-carboxamide is used as the carboxamide, N-(3-nitro-2-thienyl)-pyridine-3-carboxamide is obtained.

When N-(2-thienyl)-thiophene-3-carboxamide is used as the carboxamide, N-(3-nitro-2-thienyl)-thiophene-3-carboxamide is obtained.

Example 3.—N-(3-amino-2-thienyl)-thiazole-4-carboxamide

A mixture of 7.38 g. of N-(3-nitro-2-thienyl)-thiazole-4-carboxamide, 250 ml. of absolute ethanol, 5 ml. of concentrated hydrochloric acid, and 5 g. of 10% palladium on charcoal is shaken with hydrogen overnight. The pressure drop is 23.5 lbs. (calculated: 21.2 lbs.). The catalyst is then filtered off and washed with ethanol. The filtrate and washes are concentrated to a small volume and then diluted with 500 ml. of water. The resulting solution is neutralized with 100 ml. of 10% sodium bicarbonate and extracted with 2× 150 ml. of methylene chloride. The extracts are combined, dried over magnesium sulfate, shaken with activated charcoal, filtered, and then chromatographed over a column of 100 g. of aluminum oxide. Elution with methylene chloride affords 3.74 g. of N-(3-amino-2-thienyl)-thiazole-4-carboxamide, M.P. 156–157° C.

In Example 3, when N-(3-nitro-2-thienyl)-benzenecarboxamide is used as the nitrocarboxamide, N-(3-amino-2-thienyl)-benzenecarboxamide is obtained.

When N-(3-nitro-2-thienyl)-pyridine-3-carboxamide is used as the nitrocarboxamide, N-(3-amino-2-thienyl)-pyridine-3-carboxamide is obtained.

When N-(3-nitro-2-thienyl)-thiophene-3-carboxamide is used as the nitrocarboxamide, N-(3-amino-2-thienyl)-thiophene-3-carboxamide is obtained.

Example 4.—2-(4'-thiazolyl)-thieno-[2,3-d]-imidazole

A mixture of 150 mg. of N-(3-amino-2-thienyl)-thiazole-4-carboxamide and 12 ml. of phosphorus oxychloride is refluxed for 16 hours. The resulting dark solution is concentrated to a residue, boiled in xylene, and reconcentrated to a residue. The residue is triturated with ether and filtered. The solid crude product is then slurried in dilute sodium bicarbonate, filtered, and washed with ether. It is crystallized from ethyl acetate to give 58 mg. of 2-(4'-thiazolyl)-thieno-[2,3-d]-imidazole, M.P. 288–292° C.

In Example 4, when the above procedure is repeated using 146 mg. of N-(3-amino-2-thienyl)-benzenecarboxamide as the amino amide, 2-phenylthieno-[2,3-d]-imidazole is obtained.

When 151 mg. of N-(3-amino-2-thienyl)-pyridine-3-carboxamide is used as the amino amide, 2-(3'-pyridyl)-thieno-[2,3-d]-imidazole is obtained.

When 150 mg. of N-(3-amino-2-thienyl)-thiophene-3-carboxamide is used as the amino amide, 2-(3'-thienyl)-thieno-[2,3-d]-imidazole is obtained.

Example 5.—N-(5-phenyl-2-thienyl)-thiazole-4-carboxamide

A solution of 75 g. of thiazole-4-carbonyl chloride in 400 ml. of acetone and a separate solution of 400 ml. of 2.5 N sodium hydroxide are added simultaneously to a stirred suspension of 52 g. of 5-amino-2-phenylthiophene in 500 ml. of acetone. The temperature is maintained below 20° C. with cooling. The reaction mixture is then poured into 2500 ml. of ice water and the resulting precipitate is filtered off and washed with water, ethanol, and finally with ether. The solid product is dissolved in 300 ml. of methylene chloride, and the solution is filtered and chromatographed over 453 g. of acid-washed alumina. N-(5-phenyl - 2-thienyl)-thiazole-4-carboxamide is eluted with methylene chloride. It is recrystallized from benzene-hexane to afford 58.5 g. (83%) of substantially pure material, M.P. 154–154.5° C.

In Example 5, when the above procedure is repeated using benzoyl chloride as the acid chloride, N-(5-phenyl-2-thienyl)-benzenecarboxamide is obtained.

When pyridine-3-carbonyl chloride is used as the acid chloride, N-(5-phenyl-2-thienyl)-pyridine - 3-carboxamide is obtained.

When thiophene-3-carbonyl chloride is used as the acid chloride, N-(5-phenyl - 2-thienyl)-thiophene - 3-carboxamide is obtained.

Example 6.—N-(3-nitro-5-phenyl-2-thienyl)-thiazole 4-carboxamide

A cold mixture of 50 ml. of nitric acid in 400 ml. of acetic anhydride is added slowly to a cold solution of 47.5 g. of N-(5-phenyl-2-thienyl)-thiazole-4-carboxamide in 1200 ml. of acetic anhydride. The temperature is maintained near 0° C. with an ice salt bath, and the reaction mixture is stirred for about 20 minutes after addition is complete. It is then diluted with 1200 ml. of cold water and stirred for an additional 20 minutes, while the temperature rises to about 15° C. It is then poured into 6 l. of ice water and allowed to stand for 1½ hours. The precipitate is filtered off and washed with water and 10% sodium bicarbonate. The solid is then dissolved in a large volume of chloroform and the solution is washed with water and dilute sodium bicarbonate. The chloroform solution is then dried over magnesium sulfate, stirred with activated charcoal, filtered, and concentrated to a residue. The residue is dissolved in about 100 ml. of methylene chloride and chromatographed over a column of 500 g. of acid-washed alumina and the column is eluted with methylene chloride. The eluate is diluted with hexane, whereupon N-(3-nitro-5-phenyl-2-thienyl)-thiazole - 4-carboxamide crystallizes in essentially pure form, M.P. 228–231° C.

In Example 6, when N-(5-phenyl-2-thienyl)-benzenecarboxamide is used as the carboxamide, N-(3-nitro-5-phenyl-2-thienyl)-benzenecarboxamide is obtained.

When N-(5-phenyl-2-thienyl)-pyridine - 3-carboxamide is used as the carboxamide, N-(3-nitro-5-phenyl-2-thienyl)-pyridine-3-carboxamide is obtained.

When N-(5-phenyl-2-thienyl)-thiophene-3-carboxamide is used as the carboxamide, N-(3-nitro-5-phenyl-2-thienyl)-thiophene-3-carboxamide is obtained.

Example 7.—N-(3-amino-5-phenyl-2-thienyl)thiazole-4-carboxamide hydrochloride

A mixture of 9.0 g. of N-(3-nitro-5-phenyl-2-thienyl)-thiazole-4-carboxamide, 500 ml. of absolute ethanol, 5 ml. of concentrated hydrochloric acid, and 5.0 g. of 10% palladium on charcoal is shaken with hydrogen. After reduction is complete (as measured by the calculated hydrogen pressure drop), the mixture is filtered and the filter cake is slurried in hot ethanol and refiltered. The combined filtrates are concentrated to a small volume and filtered through supercel to remove residual charcoal. The filtrate is stirred into 2 l. of ether and the solid is filtered off. The filter cake is dried under vacuum to afford 7.85 g. (84%) of N-(3-amino-5-phenyl-2-thienyl)-thiazole-4-carboxamide hydrochloride, M.P. 171–173° C.

In Example 7, when N-(3-nitro-5-phenyl-2-thienyl)-benzenecarboxamide is used as the nitrocarboxamide, N-(3-amino - 5 - phenyl-2-thienyl)-benzenecarboxamide is obtained.

When N-(3-nitro - 5 - phenyl - 2 - thienyl)-pyridine-3-carboxamide is used as the nitrocarboxamide, N-(3-amino-5-phenyl-2-thienyl)-pyridine-3-carboxamide is obtained.

When N-(3-nitro - 5 - phenyl-2-thienyl)-thiophene-3-carboxamide is used as the nitroamide, N-(3-amino-5-phenyl-2-thienyl)-thiophene-3-carboxamide is obtained.

Example 8.—5-phenyl-2-(4'-thiazolyl)-thieno-[2,3-d]-imidazole

A mixture of 8.4 g. of N-(3-amino-5-phenyl-2-thienyl)-thiazole-4-carboxamide hydrochloride, 650 ml. of phosphorus oxychloride, and 6 drops of dimethylformamide is refluxed for about 16 hours. The mixture is cooled and filtered. The precipitate is washed with benzene and ether, then dissolved in a mixture of dilute aqueous sodium bicarbonate and warm ethyl acetate. The ethyl acetate solution is separate from the bicarbonate solution, washed with water, dried over magnesium sulfate, and finally concentrated to dryness. The residue is recrystallized from acetone-petroleum ether to give substantially pure 5-phenyl-2-(4'-thiazolyl) - thieno - [2,3-d]-imidazole, M.P. 241–242° C.

In Example 8, when 7.35 g. of N-(3-amino-5-phenyl-2-thienyl)-benzenecarboxamide is used as the amino amide 5-phenyl-2-phenylthieno-[2,3-d] - imidazole is obtained.

In Example 8, when 7.15 g. of N-(3-amino-5-phenyl-2-thienyl)-pyridine-3-carboxamide is used as the amino amide, 5-phenyl-2-(3'-pyridyl)-thieno-[2,3-d] - imidazole is obtained.

In Example 8, when 7.5 g. of N-(3-amino-5-phenyl-2-thienyl)-thiophene-3-carboxamide is used as the amino amide, 5-phenyl-2-(3'-thienyl)-thieno-[2,3-d] - imidazole is obtained.

Example 9.—N-(3-methylamino-2-thienyl)-thiazole-4-carboxamide 2 g. of N-(3-amino-2-thienyl)-thiazole-4-carboxamide are dissolved in 20 ml. of chloroform. 13 mm. (1.25 ml.) of dimethylsulfate and 10 ml. of 2 N sodium hydroxide are added to the chloroform solution and the mixture is stirred at room temperature for 6–8 hours. Glacial acetic acid is added to the solution until the pH is just about neutral to pH indicator paper. The chloroform solution is separated from the water and the water is extracted with 2× 15 ml. of chloroform. The chloroform solutions are combined and concentrated to a small volume and poured onto a column of 60 g. of alumina. The secondary amine can be separated from any tertiary amine formed by careful chromatography with mixtures of chloroform and methylene chloride; elution with methylene chloride affords solid N-(3-N - methylamino-2-thienyl) - thiazole-4-carboxamide.

In Example 9 when ethyl bromide or propyl bromide are used in place of dimethyl sulfate, N-(3-ethylamino-2-thienyl)-thiazole - 4 - carboxamide or N-(3-propylamino-2-thienyl)-thiazole-4-carboxamide are obtained.

Example 10.—1-methyl-2-(4'-thiazolyl)-thieno-[2,3-d]-imidazole

To 1.5 g. of 2-(4'-thiazolyl)-thieno-[2,3-d]-imidazole in 20 ml. of dry dimethylformamide is added 350 mg. of sodium hydride emulsion in mineral oil. 0.6 ml. of methyl iodide is added and the reaction mixture is then heated on the steam bath for about 20 minutes. The mixture is cooled, carefully diluted with 40 ml. of water, and then extracted with 3× 20 ml. of chloroform. The chloroform extracts are combined, washed with water, dried over sodium sulfate, and filtered. The filtrate is concentrated to a small volume and the products are separated by careful chromatography over 40 g. of alumina. On elution with benzene, the solid 1-methyl-2-(4'-thiazolyl)-thieno [2,3-d]-imidazole is obtained.

In Example 10, when acetyl chloride is used in place of methyl iodide, 1-acetyl-2-(4'-thiazolyl)-thieno-[2,3-d] imidazole is obtained.

It should be understood that although this invention has been described with reference to particular embodiments thereof, changes and modifications may be made which are within its intended scope;

What is claimed is:

1. A compound having the formula

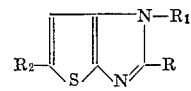

where R is phenyl, halophenyl, naphthyl, halonaphthyl or an aromatic heterocyclic radical selected from the group consisting of furyl, pyridyl, pyrazinyl, and thiazolyl wherein the point of attachment is at a carbon atom of said radical and the remaining carbon atoms of said ring are substituted with a member of the class consisting of hydrogen and loweralkyl groups; $R_1$ is hydrogen, lower alkyl, benzyl, loweralkanoyl, benzoyl, phenyl lower alkanoyl or hydroxyloweralkyl; and $R_2$ is hydrogen, halogen, phenyl, halophenyl, naphthyl, or loweralkyl, and non toxic acid addition salts thereof.

2. The compound of claim 1 where R is thiazolyl, and $R_1$ and $R_2$ are hydrogen.

3. The compound of claim 1 where R is thiazolyl, $R_1$ is hydrogen, and $R_2$ is phenyl.

References Cited

UNITED STATES PATENTS

| | | | |
|---|---|---|---|
| 2,532,292 | 12/1950 | Cusic. | |
| 2,985,661 | 5/1961 | Hein et al. | 260—30 |
| 3,017,415 | 1/1962 | Sarett et al. | 260—30 |
| 3,278,547 | 10/1966 | Brown | 260—309. |
| 3,325,506 | 6/1967 | Jones et al. | 260—30 |

OTHER REFERENCES

Alles et al.: J. Pharm. and Exp. Therap., 72, p. 26 (1941).

Burger: Medicinal Chemistry, 2d ed., Interscience, 1960 pp. 79–81.

Elderfield: Heterocyclic Compounds, vol. 5, Wiley 1957, pp. 274–85, 420–2.

Gilman et al.: J. Am. Chem. Soc., 47, pp. 245– (1925).

Hartough et al.: Heterocyclic Compounds, Interscience 1954, p. 34.

Rhodehamel: J. Am. Pharm. Assn., 31, pp. 281– (1942).

Williams: Detoxification Mechanisms, Wiley, 1947, pp 194–5.

ALEX MAZEL, Primary Examiner

R. J. GALLAGHER, Assistant Examiner

U.S. Cl. X.R.

260—251, 294.8, 309, 332.2; 424—250, 263, 270, 273